Sept. 16, 1958   C. W. WHEATLEY   2,852,226
VALVE SEALING MEANS
Filed Feb. 16, 1955

INVENTOR.
C. W. Wheatley
BY
ATTORNEY.

United States Patent Office 2,852,226
Patented Sept. 16, 1958

2,852,226

VALVE SEALING MEANS

Charles W. Wheatley, Tulsa, Okla.

Application February 16, 1955, Serial No. 488,606

1 Claim. (Cl. 251—175)

This invention relates to a flexible seal for plug valves and more particularly, but not by way of limitation, to a seal adapted for disposition in a circular recess within the plug valve body as shown in my co-pending application No. 398,001, filed December 14, 1953.

The usual plug valve of today is provided with a plug body having a plurality of circumferentially disposed grooves. A suitable lubricating grease is forced under pressure into the annular space between the plug and the valve body and into the grooves in an effort to seal the valve to preclude the passage of fluid therethrough in a closed position. When the valve is utilized within a flow line transporting fluids under high pressure, the lubricant is frequently swept out of the grooves and away from the valve to seriously impair the sealing qualities of the valve. Many liquids carried by flow lines will attach the lubricant and dissolve it. In this instance not only is the valve rendered inefficient, but also the liquid flowing therethrough may become contaminated, thus delivering an inadequate product to the consumer. It will be apparent that this sealing means is very inefficient and undesirable. The present invention contemplates an efficient positive sealing means for a plug valve by providing a flexible sealing plate molded to substantially conform to the arcuate shape of the plug body of the valve to fit snugly within a complementary recess disposed thereon. The novel sealing means is further designed to utilize the pressure acting upon the outward surfaces thereof which are in contact with the fluid in the line to increase the sealing efficiency when the valve is closed.

It is, therefore, an important object of this invention to provide a flexible sealing plate for plug valves adapted to conform to the arcuate contour of a recess in the plug body of a valve to form an efficient substantially leakproof sealing of the valve under varying pressures commonly utilized in flow lines when the valve is in a closed position.

It is another object of this invention to provide a flexible sealing plate for plug valves designed to utilize the pressure acting therethrough to increase the efficiency of the sealing properties of the seal when the valve is in a closed position.

It is still another object of this invention to provide a sealing plate for plug valves which is of simple and economical construction.

Other objects and advantages of the invention will be evident from the following detailed description, read in conjunction with the accompanying drawings, which illustrate my invention.

Figure 1:
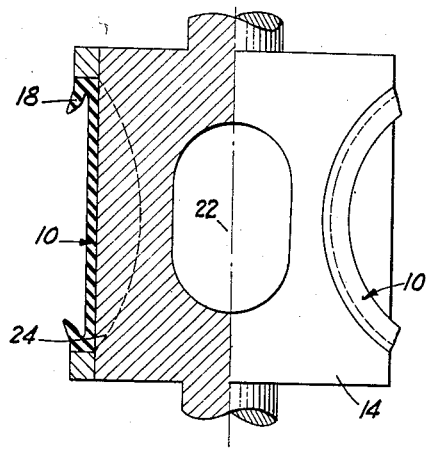
Figure 1 is an environment view partially in section depicting a plug body of a valve in a vertical disposition with the novel sealing plate disposed thereon.
Figure 3:
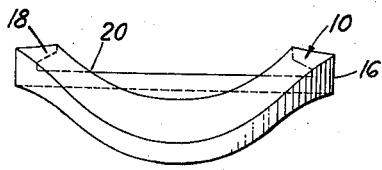
Figure 3 is an end elevational view of the novel sealing plate with certain portions shown in dotted lines for clarity.
Figure 2:
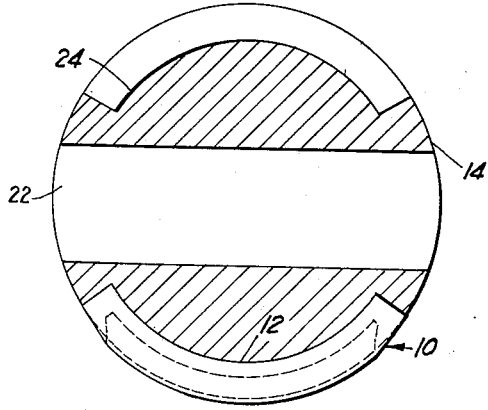
Figure 2 is an end view of a plug body depicting a pair of recesses on the arcuate surface thereof, one of which recesses has a novel seal disposed therein.
Figure 5:
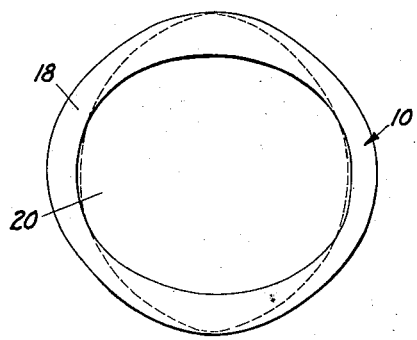
Figure 5 is a plan view of the novel sealing plate with certain portions shown in dotted lines for clarity.
Figure 4:
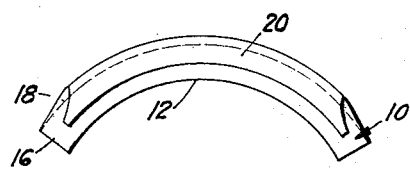
Figure 4 is a side elevational view of the novel sealing plate depicting the arcuate contour of the underside of the seal plate.

Referring to the drawings in detail, reference character 10 refers in general to a flexible sealing plate preferably made of any suitable pliable material, such as molded rubber, neoprene, or the like, but not limited thereto. Referring to Fig. 4, the seal 10 is molded with an arcuate shaped underside 12 adapted to substantially conform to the curved surface of a plug body 14 (Figs. 1 and 2) in a manner as will be hereinafter set forth. The seal 10 is provided with a circumferential upstanding side wall or edge 16 which is provided with a flange 18 extending inwardly at an angle around the inner circumference thereof so that the flange 18 will be continuously pressed against the inner surface of the plug valve (not shown) while in a closed position. The disposition of the edge 16 and the flange 18 provides a recess or groove 20 within the upper face of the seal 10 for a purpose as will be hereinafter set forth.

The usual plug body 14 is provided with a passageway 22 extending longitudinally therethrough, and diametrically opposed recesses 24 (Figs. 1 and 2) axially positioned at right angles to the longitudinal axis of the passageway 22. The recesses 24 are usually of arcuate shape to receive a suitable sealing member. The arcuate surface 12 of the seal 10 is adapted to conform to the configuration of the groove 24 as is clearly shown in Fig. 2. The pressure of any suitable securing means (not shown) as will be hereinafter set forth will urge the seal disposed in the plug recess 24 into a tighter conformation therewith and will in no way exert undue strain to cause any rupturing or distortion of the seal.

Operation

A plug valve (not shown) is normally disposed within a fluid line (not shown) in order to intermittently stop the flow of fluid therethrough. It will be understood that in the operation of a plug valve, and particularly the plug valve of my aforementioned co-pending application, the plug 14 is adapted to be rotated about a vertical axis to an alternately open and closed position. In one position of rotation the passage 22 is in substantial alignment with the fluid line to permit the fluid therein to flow through the valve. In another position of rotation, the passageway is moved out of communication with the fluid line and the diametrically opposed recesses 24 are in substantial alignment with the flow line. It will be apparent that an adequate seal must be maintained around the recesses in order to preclude the passage of fluid around the plug 14.

The arcuate surface 12 of the seal 10 conforms to the curved surface of the recess 24 so that the seal disposed therein seats in an easy undistorted position thereagainst. The seal recess 20 is adapted to receive any suitable locking plate (not shown) which is preferably of a complementary contour and is secured therein by any suitable means (not shown), such as screws or the like, which pass through the locking plate and the seal and extend into the body of the plug 14 to firmly secure the seal within the groove or recess 24. It will be apparent that the locking plate may be made an integral part of the sealing plate 10 by molding the seal around the locking plate.

It will be apparent that the fluid pressure within the flow line (not shown) will fill the chamber 20 and act upon the seal 10 with a thrusting force at right angles to all the exposed surfaces thereof. This pressure will urge the inwardly extending flange 18 outward to seal more tightly against the adjacent inner walls of the fluid line, thus assuring an efficient, leak-proof seal therearound. The greater the pressure acting upon the face of the seal, the more efficient the sealing qualities thereof.

From the foregoing, it will be apparent that the present invention provides a flexible sealing plate adapted to conform to the contour of a recess in a tubular plug valve body to assure an efficient sealing of the valve in a closed position. The design of the seal permits the utilization of the fluid pressure acting upon the valve to maintain an even better sealing action. The arcuate contour of the novel sealing plates precludes the possibility of distortion and damage of the seal during use, thus assuring a substantially leak-proof plug valve in a fluid line. The design of the novel seal lends itself to ease of installation and economy of construction.

Changes may be made in the combination and arrangements of parts as heretofore set forth in the specification and shown in the drawing, it being understood that any modification in the precise embodiment of the invention may be made within the scope of the following claim without departing from the spirit of the invention.

I claim:

The combination of a valve body having flow passages which communicate with a central chamber, a tubular rotatable plug body disposed in said chamber, said plug body having a bore which cooperates with said flow passages to control flow when the plug body is rotated, a recess of tubular shape in the plug body and concentrically disposed with respect thereto, flexible sealing means disposed within the recess and cooperating therewith, said sealing means provided with an arcuate contour to conform to the tubular shape of said recess, a circumferential upstanding side wall provided on the sealing means, an inwardly extending flange provided around the periphery of the side wall, said flange being of a tapered configuration in cross-section whereby a chamber is provided to utilize pressure acting upon the seal to flex the flange outwardly into contact with the inner wall of the valve body to assure an efficient sealing thereof, said tapered flange simultaneously providing for a rotation of the plug body within the valve body without damage to the seal means in the recess.

References Cited in the file of this patent

UNITED STATES PATENTS

| | | |
|---|---|---|
| 2,372,869 | Wheatley | Apr. 3, 1945 |
| 2,505,270 | Allen | Apr. 25, 1950 |
| 2,545,834 | Westbrook | Mar. 20, 1951 |

FOREIGN PATENTS

| | | |
|---|---|---|
| 11,694 | Great Britain | of 1895 |
| 744,193 | Germany | of 1944 |